Figure 1:
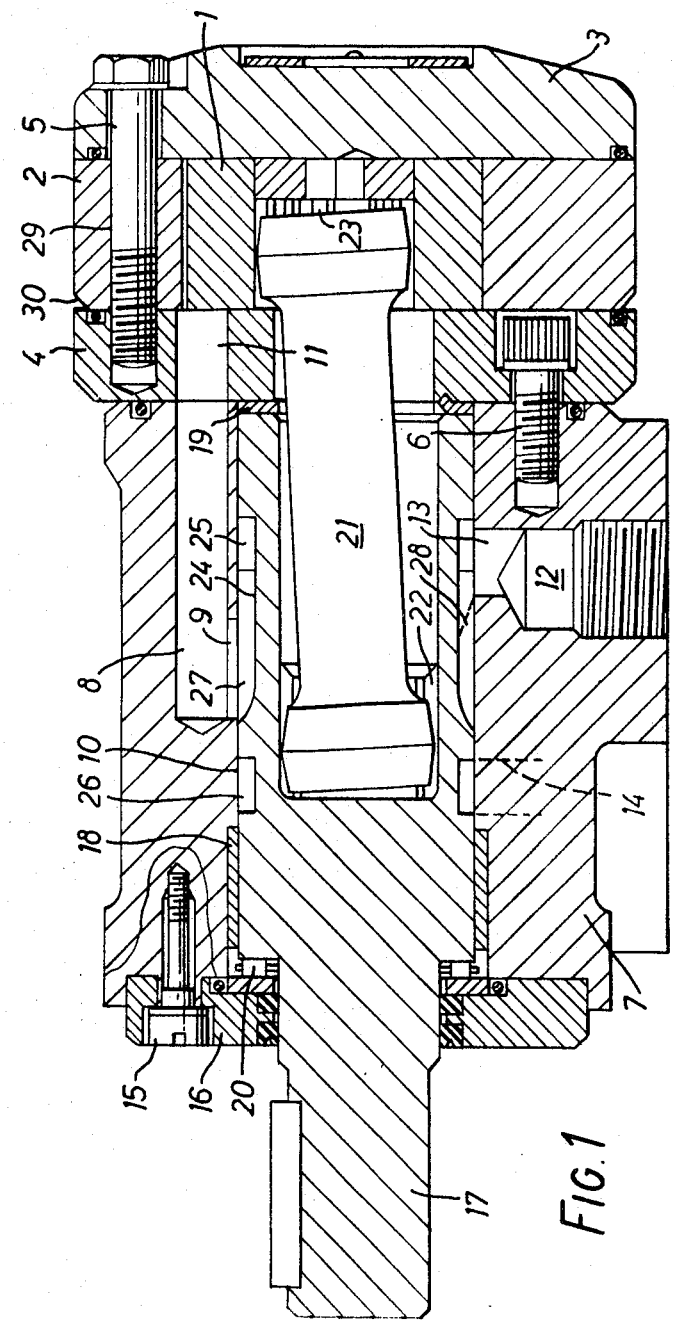

United States Patent [19]
Ohrberg

[11] 3,758,242
[45] Sept. 11, 1973

[54] ROTARY PISTON MACHINE

[75] Inventor: Carl Verner Ohrberg, Nordborg, Denmark

[73] Assignee: Donfoss A/S, Nordborg, Denmark

[22] Filed: Feb. 25, 1972

[21] Appl. No.: 229,271

[30] Foreign Application Priority Data
Mar. 8, 1971 Germany.................. P 21 10 863.4

[52] U.S. Cl.................................. 418/61, 418/107
[51] Int. Cl. ............................................. F03c 1/02
[58] Field of Search........................ 418/61, 107, 57, 418/19, 29

[56] References Cited
UNITED STATES PATENTS
| | | | |
|---|---|---|---|
| 3,270,682 | 9/1966 | Charlson............................... | 418/57 |
| 1,486,836 | 3/1924 | Hill........................................ | 418/19 |
| 3,692,440 | 9/1972 | Woodling............................. | 418/61 |

Primary Examiner—C. J. Husar
Attorney—Wayne B. Easton

[57] ABSTRACT

The invention relates to a rotary piston machine in which an externally toothed wheel and an internally toothed ring between them form displacement chambers, the toothed wheel being connected by a universal joint shaft to a rotary slide valve. The connection between the toothed wheel and the associated rotary slide valve results in a certain amount of play. In the case of a pump, the rotary slide valve leads the toothed wheel in the rotary direction. In the case of a motor, the rotary slide valve lags the toothed wheel in the rotary direction. This leading and lagging, although only slight, e.g., 1°, results in the machine suffering a loss in capacity because of imprecise control of the rotary slide valve. Means are provided wherein the lead or lag is compensated for by offsetting the ring or wheel member a predetermined circumferential distance from a neutral position.

4 Claims, 7 Drawing Figures

ROTARY PISTON MACHINE

The present invention relates to a rotary piston machine in which an externally toothed wheel and an internally toothed ring between them form displacement chambers, the toothed ring is firmly positioned between two parts of the casing, the toothed wheel is connected by way of a universal joint shaft to a rotary slide which, together with a valve part solid with the casing, forms a diversion valve, and the attachment of the toothed ring to the casing, and of the toothed wheel to the universal joint shaft is achieved by means of axially extending openings.

In machines of this kind, the connection between the toothed wheel and the associated rotary slide by way of the universal joint shaft results in a certain amount of play. If, in the case of a pump, the rotary slide is connected to the main shaft, it leads the toothed wheel in the rotary direction. If, however, the toothed wheel drives the rotary slide as is the case in a motor, the rotary slide lags behind the toothed wheel in the rotary direction. This leading and lagging, although only slight, e.g., 1°, results in the machine suffering a loss in capacity because of the imprecise control of the rotary slide. The lead and lag angles become somewhat greater if the universal joint shaft is coupled to the main shaft and is subjected to additional torsion as the input or output capacity of the machine increases. Furthermore, the lead and lag angle is dependent upon the direction in which the machine rotates.

The object of the invention is to provide a rotary piston machine of the initially stated kind in which, with the aid of the same components, the lead and lag of the rotary slide can be wholly or partially offset at choice for anticlockwise or clockwise movement.

According to the invention, this object is achieved by a form and/or arrangement of the openings in a toothed element such that the toothed element may be mounted offset from the neutral position in both directions.

This construction is based on the fact that in many rotary piston machines there is a preferred direction of rotation, i.e., they are required to turn only in one direction as when driving a conveyor belt, or they apply the main load in one direction of rotation only, e.g., when powering a winch. In the case of such preferred direction of rotation, the compensation means are solidly incorporated in the machine. This is achieved by one of the toothed elements being fitted in a position in which it is offset from the normal neutral position. By arranging for the toothed element also to be mountable in a position offset from the neutral in the opposite direction, a machine can be compensated both for clockwise and anticlockwise movement, using the same components.

In a preferred arrangement, the toothed element is a disc having parallel side walls, and the attachment openings are offset on one side with respect to the neutral position. In the case of the toothed wheel, a toothed portion can be provided which is offset from the neutral position. In the case of the toothed ring, holes, offset from the neutral position, can be provided for the fixing screws. By simply tuning the disc forming the toothed element through 180°, the machine can be compensated for clockwise and anticlockwise movement.

In this connection it is expedient to mark the toothed element in question in such a way that both during and after assembly of the machine there is a clear indication as to the direction of rotation for which compensation has been carried out. This can be achieved for example by the toothed ring containing offset holes bearing on its outer periphery a marking which, in conjunction with a marking on an adjacent casing component indicates for which direction of rotation the arrangement is intended. The marking may consist for example of a chamfer on a front edge of the toothed ring.

In another embodiment of the invention, the toothed ring contains curved fixing screw orifices which extend to both sides of the neutral position. If the toothed ring is rotated into one of the end positions of the curved orifices, compensation is provided for anticlockwise running, and if it is rotated into the other end position of the orifices, compensation for clockwise movement is achieved.

The invention will now be described in greater detail by reference to embodiments illustrated in the drawing, in which:

FIG. 1 is a longitudinal section through a first form of the rotary piston machine of the invention.

Figure 3:
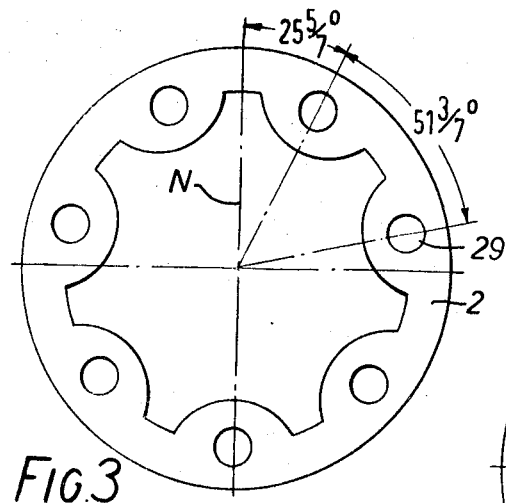
Figure 6:
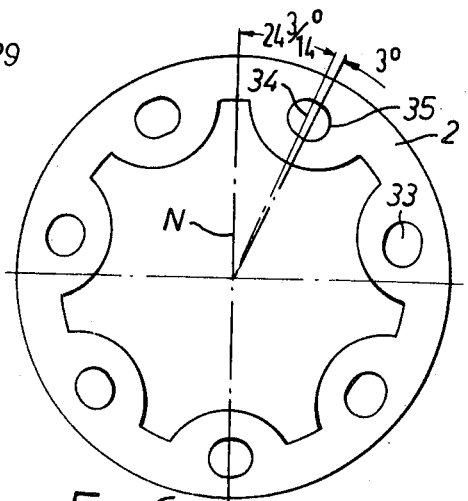
Figure 4:
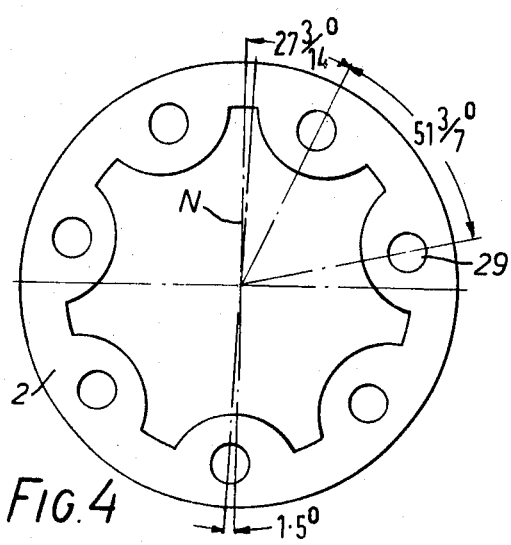
Figure 7:
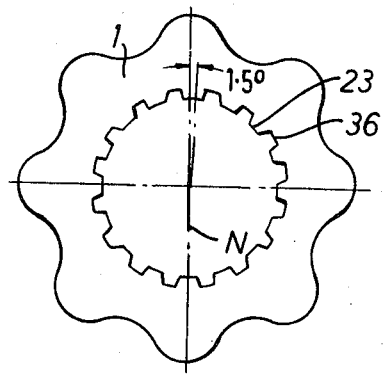
Figure 5:
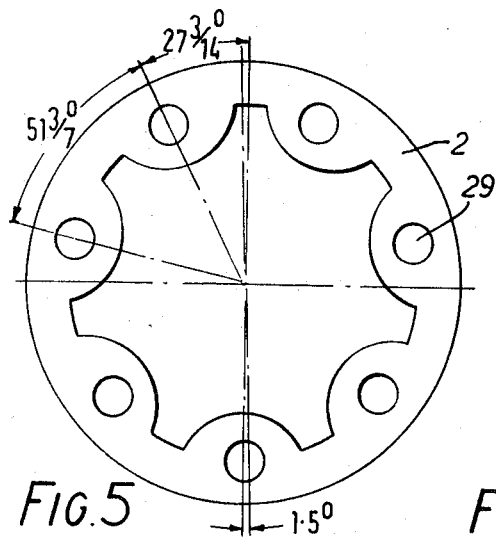
Figure 2:
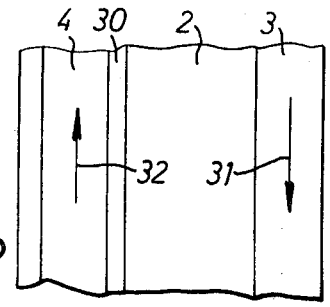

FIG. 2 is a partial plan view of the machine part accommodating the toothed element, FIG. 3 shows diagrammatically a toothed ring of normal shape, FIG. 4 illustrates a toothed ring formed in accordance with the invention and in the position for clockwise movement, FIG. 5 shows the ring of FIG. 4 in the position for anticlockwise movement, FIG. 6 illustrates a second form of toothed ring that may be used in the invention, and FIG. 7 shows a toothed wheel that may be used in accordance with the invention.

The machine seen in FIG. 1 comprises a toothed wheel 1 and a toothed ring 2 cooperating therewith. These parts are enclosed on one side by a cover plate 3 and on the other by an intermediate plate 4. The cover plate 3, the toothed ring 2 and the intermediate plate 4 are interconnected by screws 5. The intermediate plate 4 and thus the unit just described are secured to a casing by means of screws 6. The casing contains connecting passages 8, which each connect an opening 9 at the inner periphery 10 of the casing, forming part of a diversion valve, to passages 11 in the intermediate plate 4, which passages extend to the displacement chambers between the toothed elements 1 and 2. Furthermore, the casing comprises ports 12 which, by way of passages 13 or 14, likewise extend to the inner peripheral wall 10 but are axially offset from the opening 9. A closure plate 6 is secured to the free end of the casing by means of screws 15.

A main shaft 17 is mounted within a sleeve bearing 18 and between a bearing disc 19 and an axial bearing 20 held by the plate 16. A universal joint shaft 21 engages by one of its ends in a toothed portion 22 on the main shaft 17, and by its other end in a toothed portion 23 in the toothed wheel 1.

The main shaft 17 is designed as a rotary slide 24 which contains two annular grooves 25 and 26 which communicate with the connecting passages 13 and 14. From these peripheral grooves there alternately extend axial grooves 27 and 28, the number of which is twice the number of teeth on the wheel 1, whereas the number of openings 9 corresponds to the number of teeth on the ring 2. Consequently, the chambers formed between the toothed wheel 1 and the toothed ring 2, which has one tooth more than the wheel, are filled with and emptied of pressurized fluid in the correct sequence. The rotary slide 24 and the inner periphery 10 of the casing thus act in the usual way as a diversion valve.

The toothed ring 2 contains axially extending holes 29 for the screws 5. FIG. 3 illustrates how, in the case of a normal rotary piston machine, these openings 29 are formed as bores and are each symmetrically disposed in the central plane of a tooth, it being assumed that the screw threads in the intermediate plate 4 are similarly symmetrically disposed. The pitch is 51 3/7°. The distance of a bore 29 from the neutral line N is 25 5/7°, thus corresponding to one-half of the pitch.

In contrast to this, although a pitch of 51 3/7° is maintained in the case of the toothed ring of the invention which is illustrated in FIG. 4, the distance of the axis of the bore from the neutral line N is increased to 27 3/14°. This corresponds to offsetting the bores 29 from the neutral position by 1.5°. If it is assumed that FIG. 4 applies to clockwies revolution, then by turning the toothed ring 2 into the position shown in FIG. 5, the same toothed ring can be used for anticlockwise movement. The amount of offset, i.e., 1.5°, here selected as an example corresponds in a particular type of machine both to the compensation of play and of torsion under normal load.

To prevent incorrect assembly and thus also to indicate the compensated direction of rotation after the machine has been assembled, the toothed ring 2 has a chamfer 30 at the edge of an end face. Also, the cover plate 3 and intermediate plate 4 are marked with arrows 31 and 32 which indicate the direction of rotation of the main shaft 17. The chamber 30 in each case faces that arrow which indicates the compensated direction of rotation.

In the arrangement shown in FIG. 6, a toothed ring 2 contains curved openings 33 for the fixing screws 5, these openings having semicircular ends 34 and 35. The centre points of these semi-circular ends are disposed on the two sides of the neutral line N (see the lower opening). For a required amount of offset of 1.5°, this means that the centre points are 3° apart. The machine is adapted for clockwise and anticlockwise running simply by turning the toothed wheel 2 until either the end 34 or the end 35 of the openings encounter the screws.

FIG. 7 is a diagrammatic illustration of a toothed wheel 1. The toothed portion 23 of the wheel comprises grooves 36 which can be considered as being axially extending openings and which cooperate with complementary teeth on the end of the universal joint shaft 21. The teeth and grooves of the toothed portion are uniformly distributed over the periphery. The toothed portion is so arranged that its line of symmetry is offset by 1.5° from the neutral line. The neutral line indicates that position at which all the parts of the rotary piston machine would be precisely in alignment with each other, without there being any play and torsion. The toothed wheel 1, which is here arranged for compensation in the anticlockwise movement, can also be used in the same machine for compensation in the clockwise direction by simply being turned through 180°.

FIGS. 3 to 7 are to be regarded as only diagrammatic. The toothed rings and wheels illustrated do not correspond to the toothed ring 2 and the toothed wheel 1 of FIG. 1 as regards size and number of teeth. Furthermore, the toothed wheel seen in FIG. 7 would have to comprise seven instead of eight teeth if it is to be used in conjunction with the toothed ring of FIGS. 3 to 6.

I claim:

1. A rotary piston machine comprising, a casing, cooperating and relatively movable internally and externally toothed ring and wheel members for forming expansible and contractible chambers therebetween, said wheel member being in movable relation to the casing, valve passages in said casing, valve means rotatable in said casing and cooperable with said valve passages, universal joint shaft means between said wheel member and said valve means, said ring member being offset from a neutral position on the order of one angular degree to compensate for play in said universal joint shaft means.

2. A rotary piston machine according to claim 1 wherein said ring member has circumferentially arranged bolt holes, said bolt holes being offset from a neutral position so that said ring member is offset from a neutral position.

3. A rotary piston machine according to claim 1 including internal teeth means on said wheel member in engagement with teeth means on said universal joint shaft means, said internal teeth means of said wheel member being circumferentially offset from a neutral position.

4. A rotary piston machine according to claim 1 wherein said ring member has circumferentially arranged bolt holes enlarged in both circumferential directions so that said ring member may be offset in either circumferential direction.

* * * * *